United States Patent
Sano et al.

(10) Patent No.: US 8,035,271 B2
(45) Date of Patent: Oct. 11, 2011

(54) STATOR CORE AND ROTATING ELECTRIC MACHINE

(75) Inventors: Shinya Sano, Toyota (JP); Eiji Yamada, Owariasahi (JP); Kazutaka Tatematsu, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 73 days.

(21) Appl. No.: 12/445,556

(22) PCT Filed: Oct. 17, 2007

(86) PCT No.: PCT/JP2007/070683
§ 371 (c)(1),
(2), (4) Date: Apr. 14, 2009

(87) PCT Pub. No.: WO2008/047942
PCT Pub. Date: Apr. 24, 2008

(65) Prior Publication Data
US 2010/0007236 A1    Jan. 14, 2010

(30) Foreign Application Priority Data
Oct. 20, 2006 (JP) .................. 2006-286463

(51) Int. Cl.
*H02K 1/12* (2006.01)
(52) U.S. Cl. .................. 310/216.049; 310/216.135
(58) Field of Classification Search ........... 310/216.008, 310/216.009, 216.049, 216.051, 216.055, 310/216.058, 216.068, 216.087, 216.089, 216.135
See application file for complete search history.

(56) References Cited

U.S. PATENT DOCUMENTS

| | | | | |
|---|---|---|---|---|
| 2,774,897 | A * | 12/1956 | Matthews | 310/216.135 |
| 6,020,667 | A * | 2/2000 | Carey et al. | 310/216.049 |
| 6,049,153 | A * | 4/2000 | Nishiyama et al. | 310/216.009 |
| 2007/0046132 | A1* | 3/2007 | Yamamoto et al. | 310/218 |
| 2009/0039727 | A1* | 2/2009 | Kato | 310/216 |

FOREIGN PATENT DOCUMENTS

| | | |
|---|---|---|
| JP | 57-047840 U | 3/1982 |
| JP | 05-095645 A | 4/1993 |
| JP | 06-014482 A | 1/1994 |
| JP | 08-163834 A | 6/1996 |
| JP | 08-196048 A | 7/1996 |
| JP | 11-341716 A | 12/1999 |
| JP | 2004-328965 A | 11/2004 |
| JP | 2005-354870 A | 12/2005 |
| JP | 2006-115581 A | 4/2006 |

* cited by examiner

*Primary Examiner* — Dang Le
(74) *Attorney, Agent, or Firm* — Sughrue Mion, PLLC

(57) ABSTRACT

A stator core includes: an assembled stator core formed of annularly arranged, divided stator cores; a fixing member disposed at an outer circumferential surface of the assembled stator core and capable of pressing the divided stator cores inward in a radial direction of the assembled stator core to annularly arrange and thus fix the divided stator cores; and a weak portion provided between the divided stator cores and the fixing member and deformable by a force exerted from the fixing member to press the divided stator cores.

10 Claims, 10 Drawing Sheets

STATOR CORE AND ROTATING ELECTRIC MACHINE

TECHNICAL FIELD

The present invention relates generally to stator cores and rotating electric machines and particularly to stator cores and rotating electric machines formed with a plurality of divided stator cores clamped annularly.

BACKGROUND ART

In recent years, hybrid vehicles and the like employ a permanent magnet type synchronous motor, and conventionally there have been proposed a variety of stator cores contemplated to facilitate assembling stators.

For example, Japanese Patent Laying-Open No. 05-095645 describes a stator core including an inner stator core having an outer circumferential surface with a plurality of elements each having a coil wound thereon and an annular outer stator core having an inner circumferential surface with the inner stator core attached thereto.

Furthermore, Japanese Patent Laying-Open No. 2004-328965 discloses a stator including a cylindrical fixing member and a stator core with a core having teeth and press-fitted in the fixing member and thus formed annularly.

A core has one end adapted to have a large circumferential length and the other end adapted to have a small circumferential length, and each core is combined such that the end having the large circumferential length and the end having the small circumferential length are alternately disposed to configure a stator core.

Configuring a stator core is not limited to press fitting divided stator cores into a cylindrical housing to configure the stator core, as described for example in Japanese Patent Laying-Open No. 2004-328965; it is also done by fixing a plurality of annularly arranged divided stator cores by an annular fixing member by shrink fitting or the like.

Any of press fitting and shrink fitting as described above is done generally with each member provided with a tolerance in view of fabrication.

As such, when divided stator cores are annularly fixed to configure a stator core, a divided stator core may project inward in a radial direction of the stator core or be slightly rotated and thus fixed.

Thus the divided stator cores may not have their respective stator teeth with their respective end surfaces, as seen in the radial direction, aligned on the circumference of a single circle and may have a stator tooth projecting radially inward. If a stator core configured as described above has a rotor disposed therein and the rotor is driven, the attraction caused between the rotor and the stator core varies for some position and the rotor may vibrate or contact the stator teeth.

If any of divided stator cores is rotated and thus fixed, the divided stator core and a divided stator core adjacent thereto have a gap therebetween, resulting in a magnetic resistance higher than that between other divided stator cores. This causes variation in distribution of magnetic resistance in the stator core in a circumferential direction and in the fabricated stator core a magnetic flux deviates.

DISCLOSURE OF THE INVENTION

The present invention has been made in view of such an issue as described above, and a first object thereof is to provide a stator core and rotating electric machine having stator teeth having their respective end surfaces each at a predetermined position and a second object thereof is to provide a stator core and rotating electric machine with divided stator cores having a gap therebetween with limited variation to achieve uniform circumferential magnetic resistance.

The present stator core in one aspect includes an assembled stator core formed of a plurality of divided stator cores annularly arranged, and a fixing member disposed at an outer circumferential surface of the assembled stator core and capable of pressing each of the divided stator cores inward in a radial direction of the assembled stator core to annularly arrange and thus fix the divided stator cores. Between the divided stator cores and the fixing member a weak portion is provided deformably by a force exerted from the fixing member to press the divided stator cores.

Note that a weak portion is a portion that not only deforms elastically, plastically or the like, but also is fractured brittlely.

Preferably, the weak portion is deformable in the radial direction of the assembled stator core. Preferably, the weak portion is integrated with at least one of an outer circumferential surface of the divided stator core and an inner circumferential surface of the fixing member. Preferably, the weak portion includes a space portion provided internal thereto.

The present stator core in another aspect includes an assembled stator core formed of a plurality of divided stator cores annularly arranged, and a fixing member disposed at an outer circumferential surface of the assembled stator core and capable of pressing each of the divided stator cores inward in a radial direction of the assembled stator core to annularly arrange and thus fix the divided stator cores. Between the divided stator cores a deformable weak portion is provided. Preferably, the weak portion is provided to the divided stator core at an end in a circumferential direction of the divided stator core. Preferably, the weak portion is deformable in a circumferential direction of the assembled stator core, Preferably, the weak portion includes a space portion provided internal thereto.

The present stator core in another aspect includes: an assembled stator core formed of a plurality of divided stator cores annularly arranged; and a fixing member disposed at an outer circumferential surface of the assembled stator core and capable of pressing each of the divided stator cores inward in a radial direction of the assembled stator core to annularly arrange and thus fix the divided stator cores, and one of the fixing member and the divided stator core is lower in hardness than the other of the fixing member and the divided stator core and one of the divided stator core and the fixing member is thus deformable by a force exerted from the fixing member to press the divided stator core.

The present rotating electric machine in one aspect includes: an assembled stator core formed of a plurality of divided stator cores annularly arranged; a fixing member disposed at an outer circumferential surface of the assembled stator core and capable of pressing each of the divided stator cores inward in a radial direction of the assembled stator core to annularly arrange and thus fix the divided stator cores; and a weak portion provided between the divided stator cores and the fixing member and deformable by a force exerted from the fixing member to press the divided stator cores. Furthermore, the present rotating electric machine further includes: a rotatable rotation shaft inner than the assembled stator core; and a rotor fixed to the rotation shaft.

The present rotating electric machine in another aspect includes: an assembled stator core formed of a plurality of divided stator cores annularly arranged; and a fixing member disposed at an outer circumferential surface of the assembled stator core and capable of pressing each of the divided stator cores inward in a radial direction of the assembled stator core to annularly arrange and thus fix the divided stator cores. The present rotating electric machine further includes: a deformable weak portion provided between the divided stator cores; a rotatable rotation shaft inner than the assembled stator core; and a rotor fixed to the rotation shaft.

The present rotating electric machine in another aspect includes: a rotatable rotation shaft; a rotor fixed to the rotation shaft; an assembled stator core formed of a plurality of divided stator cores annularly arranged; and a fixing member disposed at an outer circumferential surface of the assembled stator core and capable of pressing each of the divided stator cores inward in a radial direction of the assembled stator core to annularly arrange and thus fix the divided stator cores, and one of the fixing member and the divided stator core is lower in hardness than the other of the fixing member and the divided stator core and one of the divided stator core and the fixing member is thus deformable by a force exerted from the fixing member to press the divided stator core.

In the present stator core and rotating electric machine a divided stator core receiving a large force from a fixing member to press the divided stator core can have a weak portion deformed to reduce the force exerted from the fixing member to press the divided stator core. This can prevent a particular divided stator core from projecting radially inner than another divided stator core.

In the present stator core and rotating electric machine a divided stator core offset from a predetermined position can be displaced back to the predetermined position as a force that the positionally offset divided stator core receives from a fixing member, an adjacent divided stator core or the like to press the positionally offset divided stator core deforms a weak portion. Each divided stator core can thus be arranged at a predetermined position. This can uniform magnetic resistance between the divided stator cores and reduce or prevent deviation of magnetic flux.

In the present stator core and rotating electric machine a divided stator core offset from a predetermined position receives force exerted from a fixing member or an adjacent divided stator core to press the positionally offset divided stator core. By this force, the positionally offset divided stator core per se can deform or the fixing member can be deformed, and the positionally offset divided stator core can thus be displaced back to the predetermined position.

BEST MODES FOR CARRYING OUT THE INVENTION

Figure 1:
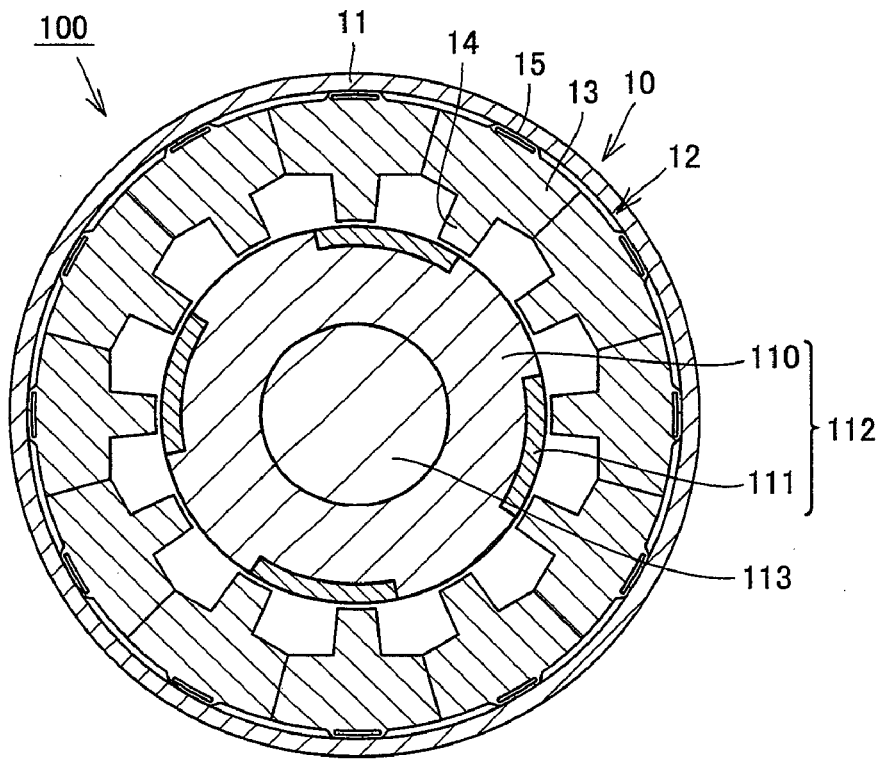
FIG. 1 is a cross section of a rotating electric machine according to a first embodiment.

Embodiments of the present invention will hereinafter be described with reference to FIG. 1 to FIG. 20. In the embodiments described below, the present invention is applicable to a motor generator (or rotating electrical machine) mounted in a hybrid vehicle. However, it is noted that the present invention is also applicable to a rotating electrical machine mounted in various types of vehicles (e.g. electrically motored vehicles including a fuel-cell vehicle and an electric-powered vehicle) other than the hybrid vehicle, and various apparatuses such as an industrial apparatus, an air-conditioning apparatus, and an environmental apparatus.

In the embodiments below, the same or corresponding components are provided with the same reference characters. Furthermore, in each embodiment, each component is not necessarily essential, and it is also expected from the beginning that some of the components can be omitted.

First Embodiment

A first embodiment will be described with reference to FIG. 1 to FIG. 14. FIG. 1 is a cross section of a rotating electric machine 100 according to the first embodiment. The FIG. 1 rotating electric machine 100 includes an annularly formed stator core 10, coils (not shown) wound on stator teeth 14 of stator core 10, a rotation shaft 113 rotatably provided at an inner circumference of stator core 10, and a rotor 112 fixed to rotation shaft 113.

Rotor 112 includes a rotor core 110 configured of iron, iron alloy or a similar magnetic material and formed of a plurality of electromagnetic steel plates stacked in layers, and a plurality of permanent magnets 111 provided at a surface of rotor core 110.

While in the FIG. 1 example a surface permanent magnet (SPM) is provided, an interior permanent magnet (IPM) may alternatively be provided. Note that in the FIG. 1 example the coils wound on stator core 10 are omitted.

Stator core 10 is cylindrically configured, and rotor 112 is rotated by a magnetic flux caused between stator core 10 and rotor 112. Note that if a rotating electric machine including this stator core 10 is applied to a hybrid vehicle, a battery supplies a current via an inverter and the like and thus rotates rotor 112.

Stator core 10 includes a circular fixing member 11 and an assembled stator core 12 disposed at an inner circumferential surface of fixing member 11.

Assembled stator core 12 is formed of a plurality of divided stator cores 13 arranged annularly at the inner circumferential surface of fixing member 11.

Fixing member 11 can be disposed at an outer circumferential surface of assembled stator core 12 to press each divided stator core 13 inward in a radial direction of assembled stator core 12 to fix divided stator cores 13 in an annular arrangement.

Figure 2:
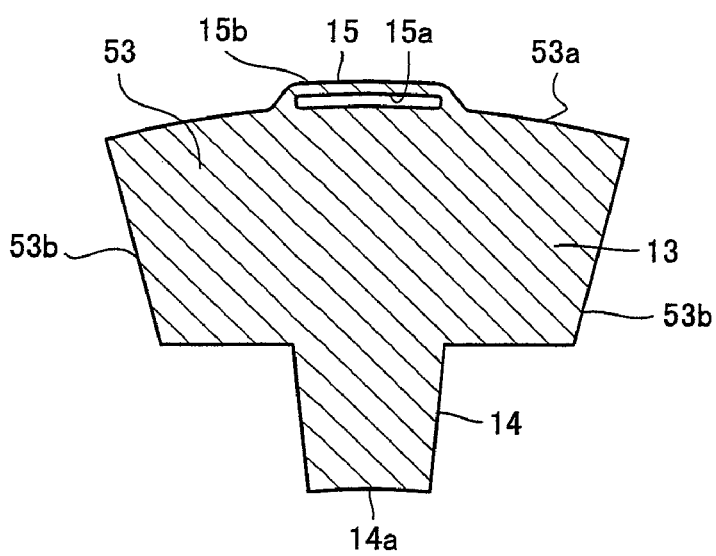
FIG. 2 is an enlarged plan view of a divided stator core.

FIG. 2 is an enlarged plan view of divided stator core 13. As shown in FIG. 2, divided stator core 13 includes an arcuate main body 53, and a stator tooth 14 provided at an inner circumferential surface of main body 53 and projecting inward in the radial direction of assembled stator core 12. Stator tooth 14 at an inner position thereof in the radial direction of assembled stator core 12 has an arcuately curved end surface 14a. Stator tooth 14 has a winding of an armature (not shown) wound thereon to form a coil.

Main body 53 is in the form of a sector and in its circumferential direction has an end surface 53b extending in the radial direction of assembled stator core 12 shown in FIG. 1. In other words, main body 53 is tapered in its radially inward direction to have a circumferential length reduced in that direction.

Main body 53 has an outer circumferential surface 53a having a weak portion 15. Weak portion 15 includes a frame 15b formed annularly and projecting from an outer surface of main body 53 and a space portion 15a defined by frame 15b.

In other words, weak portion 15 is adapted to be smaller in rigidity than divided stator core 13 and plastically deform, brittlely fracture, or the like to be deformable when it externally receives at least a predetermined force pressing it. In particular, weak portion 15 is adapted to be readily deformable in the radial direction of assembled stator core 12 and fixing member 11 shown in FIG. 1.

Figure 3:
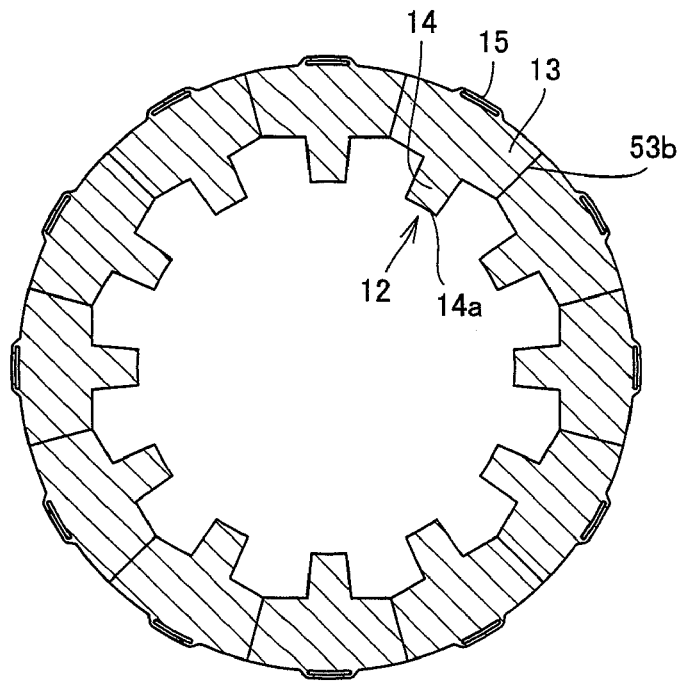
FIG. 3 is a cross section for illustrating a first step of fabricating a stator core.

Stator core 10 thus configured is fabricated in a method, as will now be described hereinafter with reference to FIG. 3 to FIG. 7. FIG. 3 is a cross section for illustrating a first step of fabricating stator core 10. As shown in FIG. 3, a plurality of divided stator cores 13 are arranged annularly to form assembled stator core 12. Divided stator cores 13 thus arranged will have their respective stator teeth 14 with their respective end surfaces 14a also arranged annularly. Note that stator teeth 14 have their respective end surfaces 14a equal in radius of curvature and thus arranged on the circumference of a single circle.

Note that divided stator core 13 has stator tooth 14 with a winding of an armature previously wound thereon. It is easier to wind the winding of the armature on each of stator teeth 14 of separate divided stator cores 13 than to do so on each stator tooth 14 of assembled stator core 12.

Figure 4:
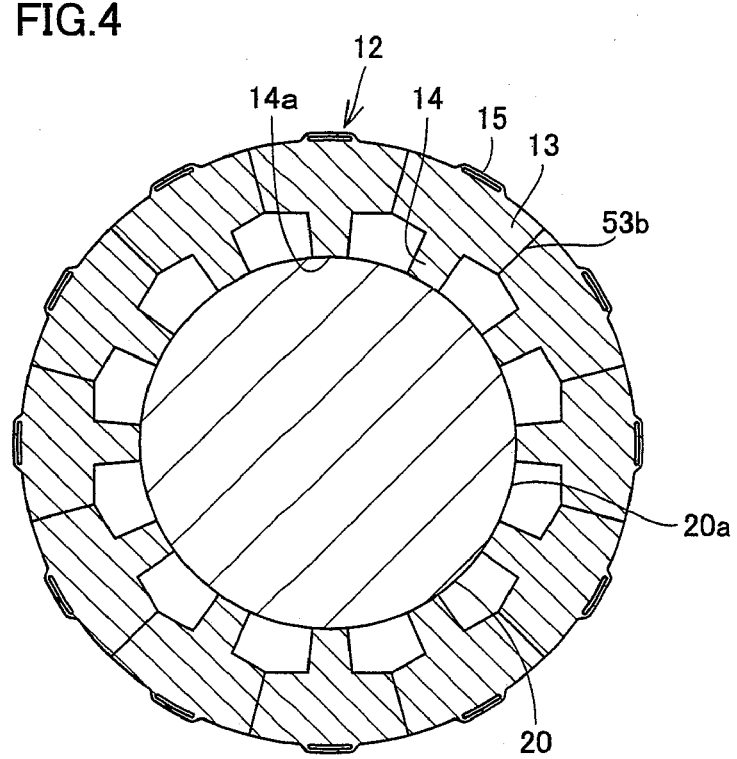
FIG. 4 is a cross section for illustrating a second step of fabricating the stator core.

FIG. 4 is a cross section for illustrating a second step of fabricating stator core 10. As shown in FIG. 4, an internal die 20 is inserted into assembled stator core 12. Internal die 20 is a column and has an outer circumferential surface 20a in contact with each stator tooth 14 at end surface 14a.

Note that internal die 20 may be configured to be radially, slightly enlargeable. When internal die 20 is inserted into assembled stator core 12, the former can be reduced in diameter to reduce or prevent the contact of internal die 20 and each divided stator core 13 that is caused when internal die 20 is inserted into assembled stator core 12.

Once internal die 20 has completely been inserted, internal die 20 is slightly increased in diameter. Stator teeth 14 at end surfaces 14a and internal die 20 at outer circumferential surface 20a can thus be brought into contact with each other and end surfaces 14a can thus be aligned around internal die 20 at outer circumferential surface 20a.

Figure 5:
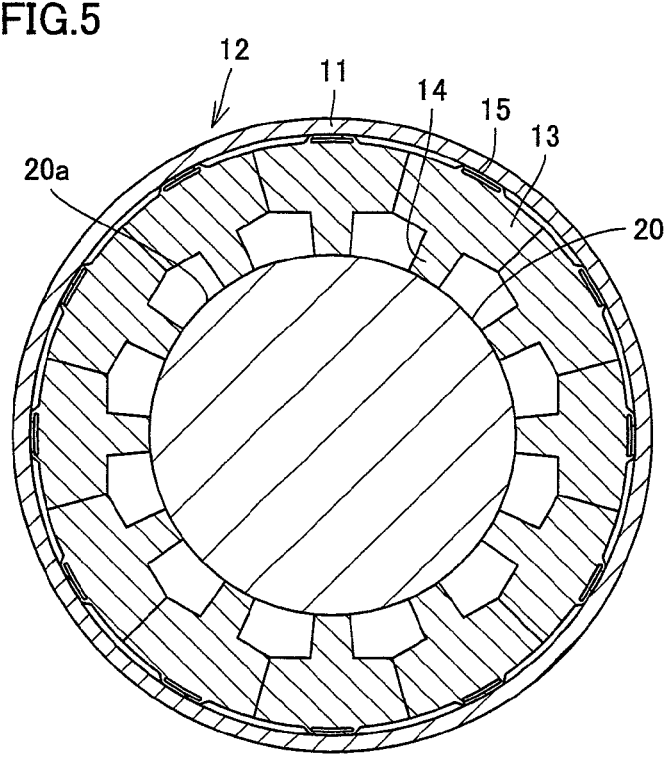
FIG. 5 is a cross section for illustrating a third step of fabricating the stator core.

FIG. 5 is a cross section for illustrating a third step of fabricating stator core 10. As shown in FIG. 5, fixing member 11 is attached to assembled stator core 12 at an outer circumferential surface by shrink fitting. Each divided stator core 13 is thus pressed by fixing member 11 radially inward.

As each divided stator core 13 is configured to taper radially inward, it has its radially inward displacement inhibited by divided stator core 13 adjacent thereto. Accordingly, adjacent divided stator cores 13 press each other with increased force and thus have increased frictional force therebetween, and assembled stator core 12 is thus fixed to an inner circumferential surface of fixing member 11.

Furthermore, as fixing member 11 is attached with internal die 20 inserted in assembled stator core 12, stator teeth 14 have end surfaces 14a pressed by internal die 20 at outer circumferential surface 20a and thus aligned precisely along outer circumferential surface 20a.

Figure 6:
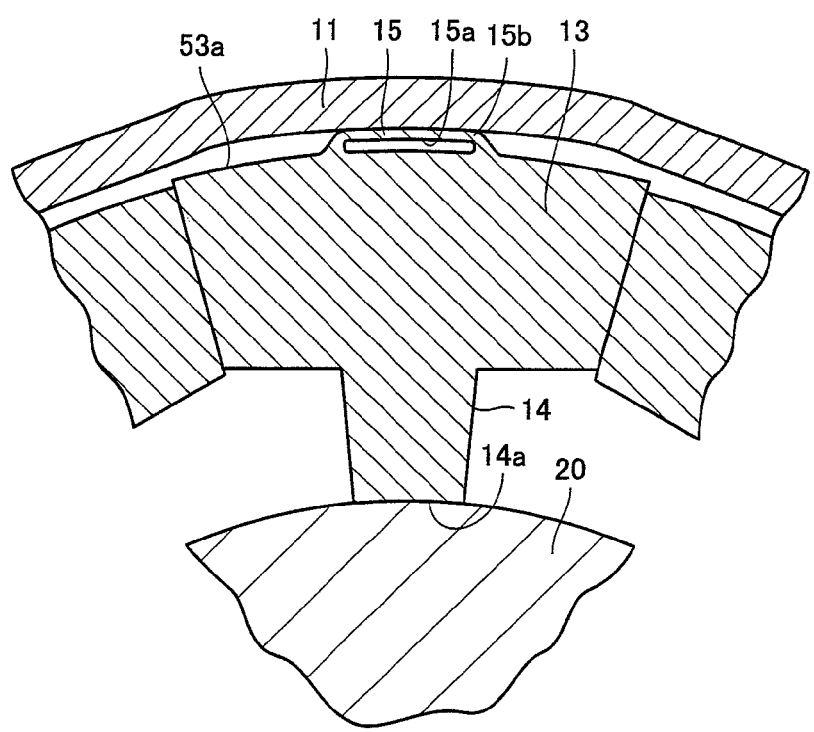
FIG. 6 is an enlarged cross section of a portion of the FIG. 5 divided stator core.

FIG. 6 is an enlarged cross section of a portion of the FIG. 5 divided stator core 13. Generally when divided stator core 13 is produced it is produced with some extent of tolerance. Furthermore, when each stator core 13 is produced a small error may be introduced.

As such, while a divided stator core 13 has its end surface 14a abutting against internal die 20 at outer circumferential surface 20a, it may have its outer circumferential surface 53a projecting radially outer than outer circumferential surface 53a of divided stator core 13 adjacent thereto.

Thus, when a particular divided stator core 13 projects radially outer than another divided stator core 13, the particular divided stator core 13 causes fixing member 11 to curve radially outward, and the particular divided stator core 13 is pressed by fixing member 11 radially inward with a force larger than that the other divided stator core 13 receives.

Figure 7:
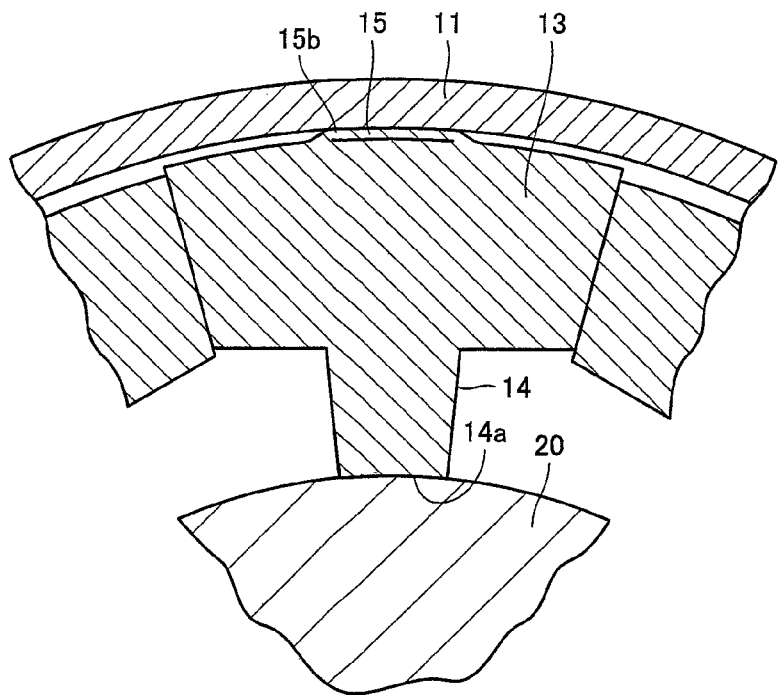
FIG. 7 is a cross section of the FIG. 6 divided stator core in a second state following a first state shown in FIG. 6.

FIG. 7 is a cross section of the FIG. 6 divided stator core 13 in a second state following a first state shown in FIG. 6. As shown in FIG. 7, the divided stator core 13 projecting radially outer than the other divided stator core 13 has its weak portion 15 deformed.

In the FIG. 7 example, frame 15b is plastically deformed to crush weak portion 15 to close space portion 15a. Weak portion 15 that plastically deforms radially inward allows fixing member 11 located threat to less bulge, which reduces a force pressing divided stator core 13.

Note that weak portion 15 may not only have frame 15b plastically deformed, as shown in the FIG. 7 example, but also be brittlely fractured. In other words, any means may be employed that allows fixing member 11 to less bulge and can also reduce internal stress caused between divided stator core 13 and fixing member 11 to press divided stator core 13 radially.

A particular divided stator core 13 is thus prevented from receiving excessively large force from fixing member 11 to significantly press the particular divided stator core 13 and each divided stator core 13 thus receives a force pressing it within a predetermined range.

Subsequently, as shown in FIG. 1, internal die 20 shown in FIG. 5 is removed from assembled stator core 12. In doing so, each divided stator core 13 receives a force pressing it within a predetermined range, and projecting of any divided stator core 13 radially inward can be reduced or prevented.

Divided stator cores 13 can thus have their respective end surfaces 14a maintained in alignment on the circumference of a single circle.

When stator core 10 thus configured has rotor 112 inserted therein, stator core 10 can have each stator tooth 14 spaced from rotor 112 by a uniform gap. Thus a winding of an armature (not shown) is supplied with a current, and a magnetic flux caused between each stator tooth 14 and rotor 112 can be caused in a uniform amount to reduce/prevent vibration of rotor 112.

Figure 8:
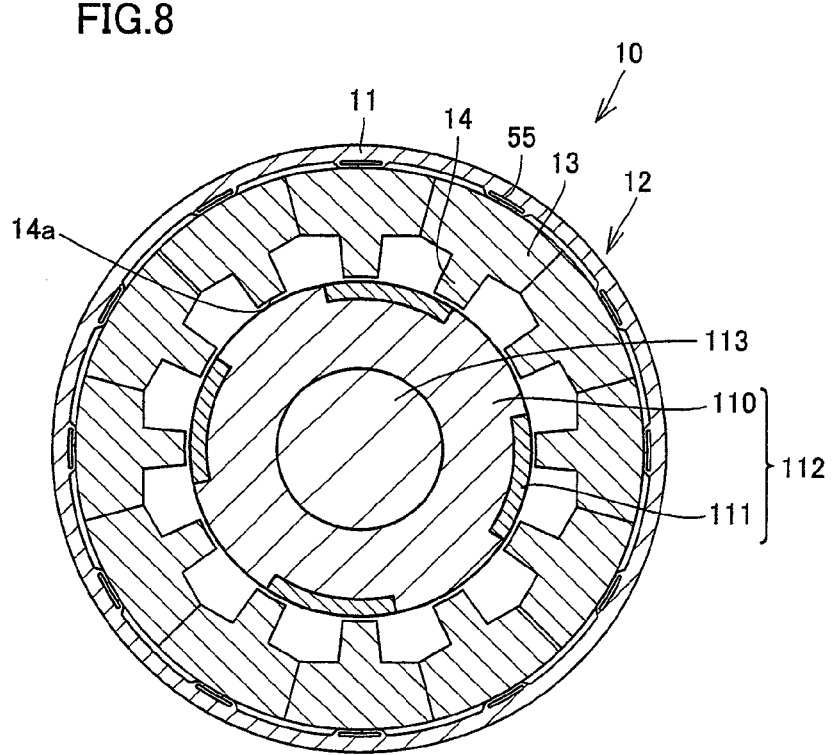
FIG. 8 is a cross section of a rotating electric machine of the first embodiment in a first exemplary variation.
Figure 9:
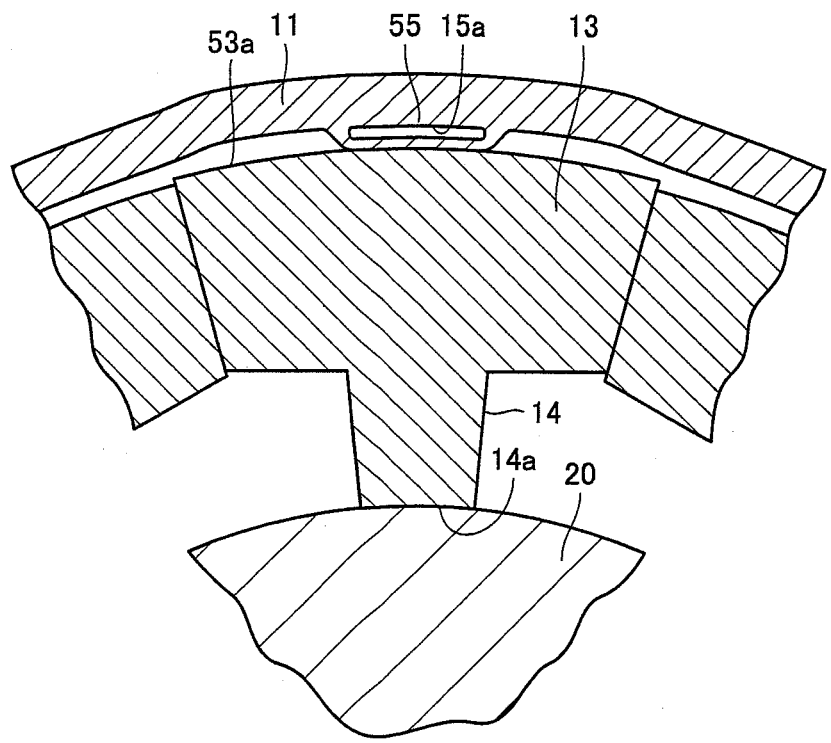
FIG. 9 is a cross section of the FIG. 8 stator core in its fabrication process when a fixing member is shrink fitted.
Figure 10:
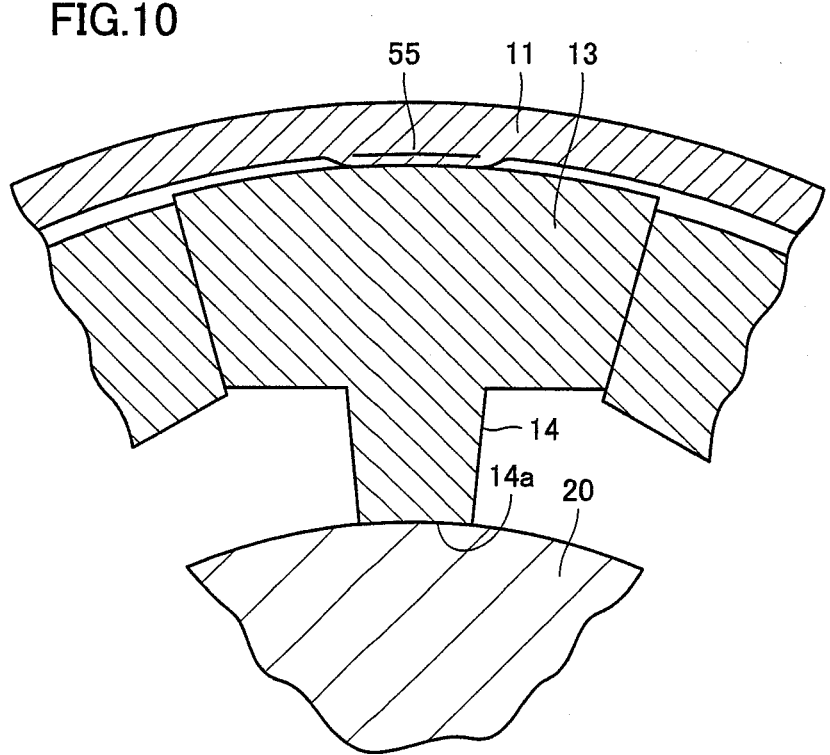
FIG. 10 is a cross section of the FIG. 9 divided stator core and the fixing member located thereat with its weak portion deformed.

FIG. 8 is a cross section of a rotating electric machine of the first embodiment in a first exemplary variation. As shown in FIG. 8, a weak portion 55 may be provided to fixing member 11 at an inner circumferential surface. FIG. 9 is a cross section of the FIG. 8 stator core 10 in its fabrication process when fixing member 11 is shrink fitted. FIG. 10 is a cross section for showing fixing member 11 with its weak portion deformed.

As shown in FIG. 9, a particular divided stator core 13 has its outer circumferential surface 53a radially outer than another divided stator core 13, and as shown in FIG. 10, weak portion 55 provided at that inner circumferential surface of fixing member 11 at which the particular divided stator core 13 is located deforms radially.

This can reduce a force exerted by fixing member 11 to press divided stator core 13 and thus reduce/prevent divided stator core 13's radially inward displacement caused when internal die 20 is removed.

Note that while weak portions 15, 55 are provided to project outward from outer circumferential surface 53a of divided stator core 13 and an inner surface of fixing member 11, weak portions 15, 55 may alternatively be provided internal to divided stator core 13 and fixing member 11.

Furthermore, an annular member having weak portion 15, 55 may be disposed between fixing member 11 and divided stator core 13.

Figure 11:
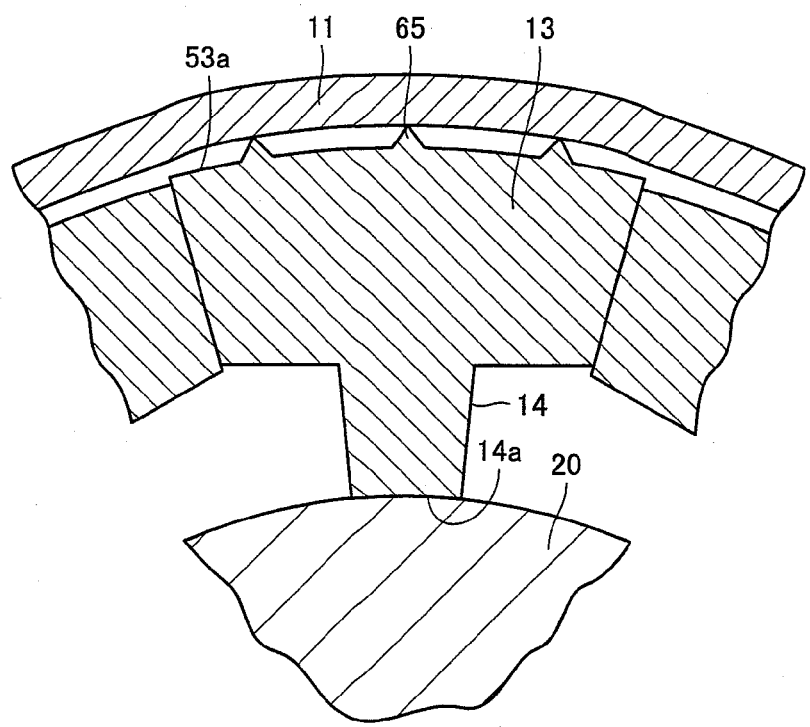
FIG. 11 is a cross section of a second exemplary variation of the first embodiment.

FIG. 11 is a cross section of a second exemplary variation of the first embodiment. As shown in FIG. 11, divided stator core 13 may have outer circumferential surface 53a having a projection 65 projecting radially outward.

Furthermore, divided stator core 13 and projection 65 are adapted to be larger in hardness than fixing member 11. This allows fixing member 11 to have its inner circumferential surface serving as a weak portion deformable by projection 65.

Figure 12:
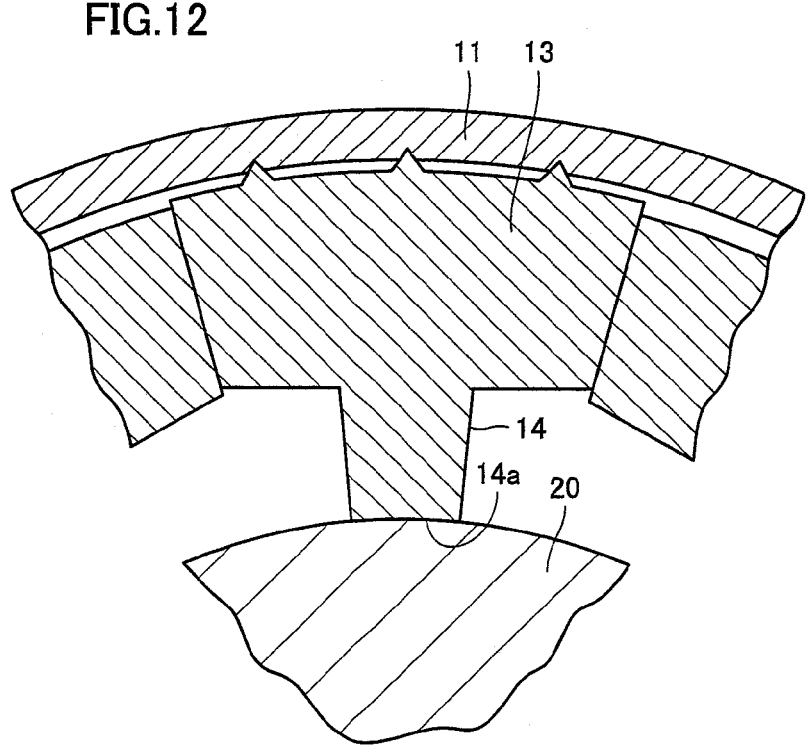
FIG. 12 is a cross section of the FIG. 11 divided stator core and fixing member in a second state following a first state shown in FIG. 11.

FIG. 12 is a cross section of the FIG. 11 divided stator core and fixing member in a second state following a first state shown in FIG. 11. As shown in FIG. 12, a particular divided stator core 13 having its outer circumferential surface 53a radially outer than another divided stator core 13 has its projection 65 entering fixing member 11.

Thus, fixing member 11 at a portion that presses radially outwardly projecting divided stator core 13 deforms to receive projection 65, and displaces radially inward to reduce bulging of fixing member 11 of that portion.

This can reduce a force exerted by fixing member 11 to press a particular divided stator core 13 having its outer circumferential surface 53a radially outer than another divided stator core 13. Thus, the FIG. 11 and FIG. 12 example, as well as the other examples described above, can also reduce/prevent the particular divided stator core 13's radially inward displacement caused when internal die 20 is removed.

Figure 13:
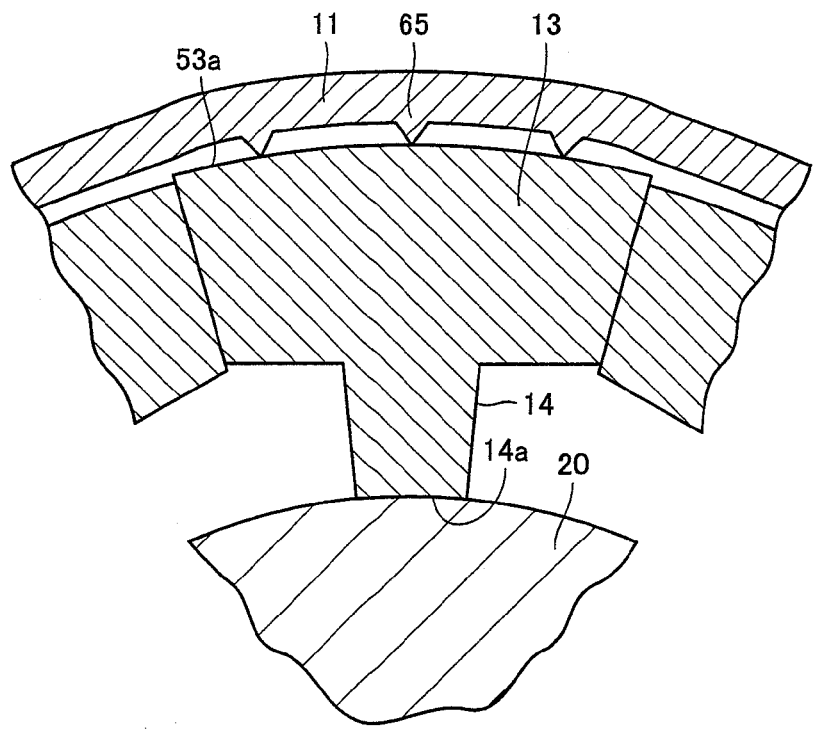
FIG. 13 is a cross section of a third exemplary variation of the first embodiment.
Figure 14:
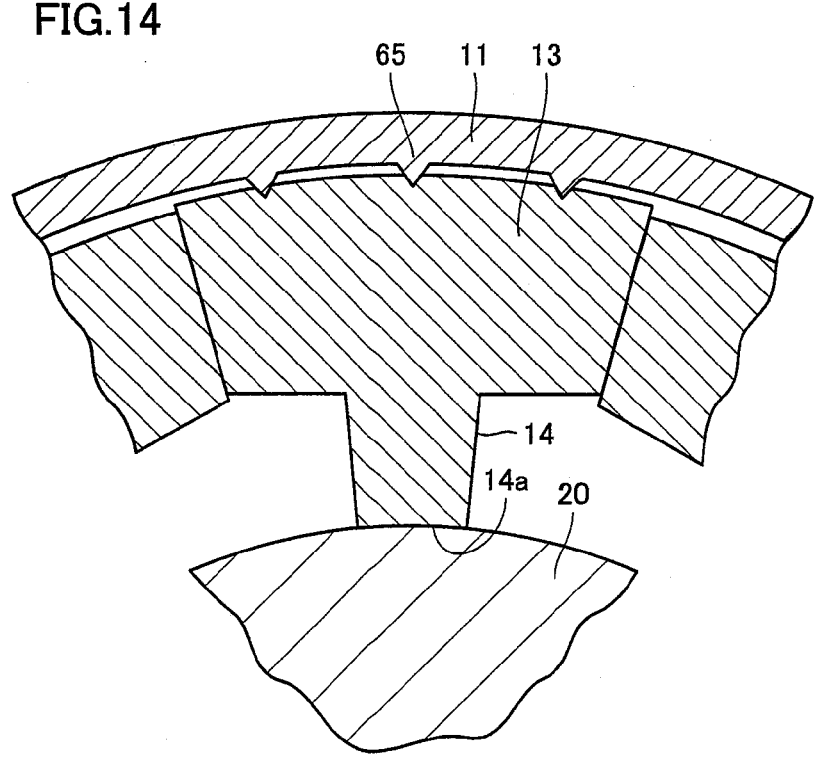
FIG. 14 is a cross section of the FIG. 13 divided stator core and fixing member in a second state following a first state shown in FIG. 13.

Note that while FIG. 11, FIG. 12 show projection 65 provided to each divided stator core 13 at outer circumferential surface 53a by way of example, projection 65 may be provided differently. FIG. 13 and FIG. 14 are cross sections of a third exemplary variation of the first embodiment.

As shown in FIG. 13, FIG. 14, fixing member 11 may be larger in hardness than divided stator core 13 and have an inner surface having projection 65 projecting radially inward.

When a particular divided stator core 13 is located radially outer than another divided stator core 13, fixing member 11 at a portion that presses the particular divided stator core 13 has projection 65 entering the particular divided stator core 13.

Projection 65 thus deforming the particular divided stator core 13 partially to enter it alleviates bulging of fixing member 11 and thus reduces a force exerted by fixing member 11 to press the particular divided stator core 13.

Second Embodiment

Reference will be made to FIG. 15 to FIG. 20 to describe a rotating electric machine and stator core according to a second embodiment. Components identical to those shown in FIG. 1 to FIG. 14 are identically denoted and will not be described repeatedly.

Figure 15:
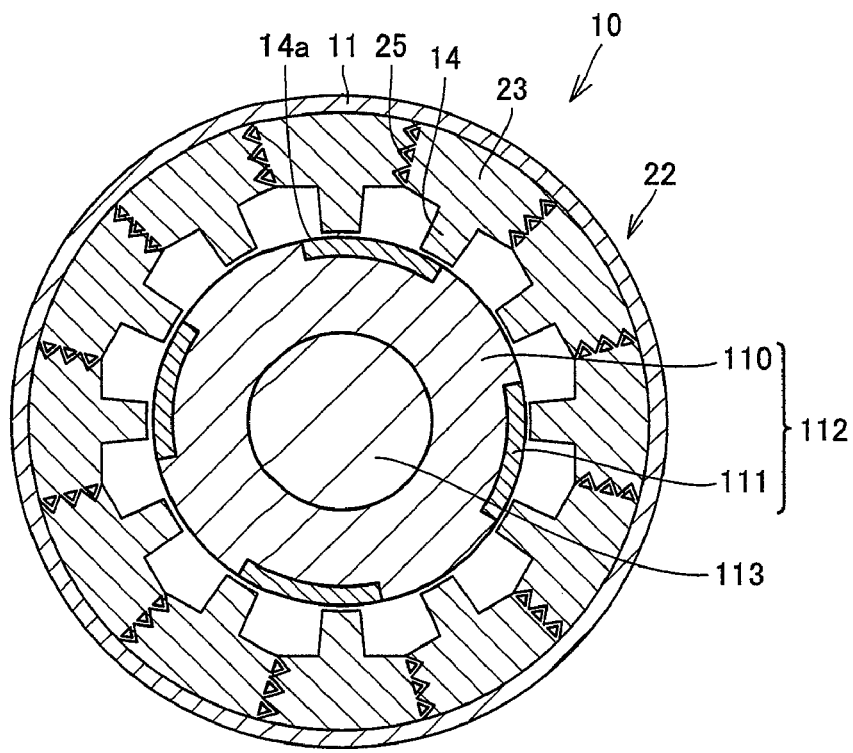
FIG. 15 is a plan view of a rotating electric machine in a second embodiment.
Figure 16:
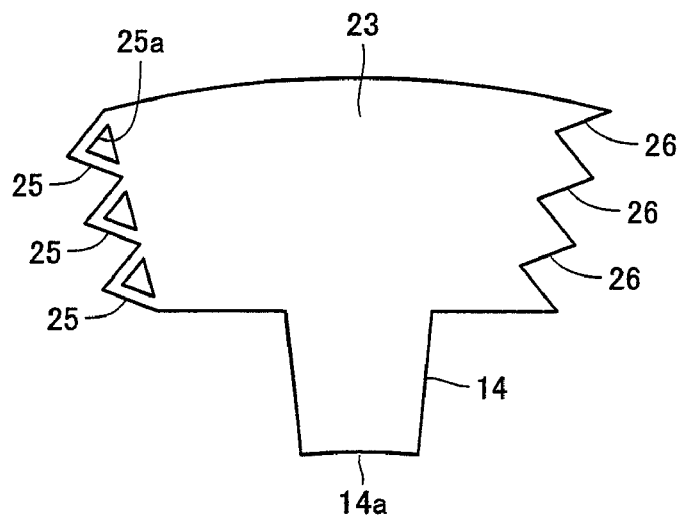
FIG. 16 is a cross section of a divided stator core.

FIG. 15 is a plan view of a rotating electric machine in the second embodiment. FIG. 16 is a plan view of a divided stator core 23. As shown in FIG. 16, divided stator core 23 in its circumferential direction has one end surface having a plurality of weak portions 25 radially arranged and also internally having a space portion 25a.

Divided stator core 23 in its circumferential direction has the other end surface having a recess 26 receiving weak portion 25 of a divided stator core 23 adjacent thereto.

In FIG. 15, stator core 10 includes fixing member 11 in the form of an annulus, and an assembled stator core 22 formed of divided stator cores 23 configured as described above and arranged at an inner circumferential surface of fixing member 11 annularly.

Figure 17:
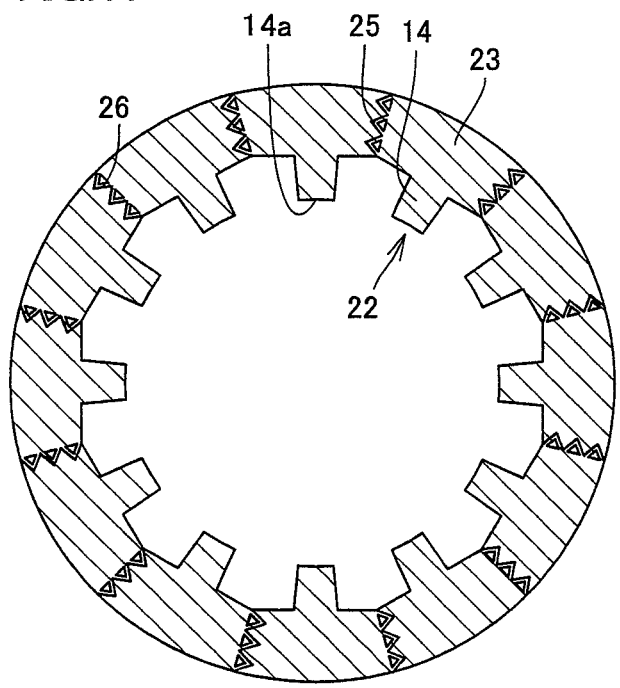
FIG. 17 is a cross section for illustrating a first step of fabricating a stator core in the second embodiment.
Figure 18:
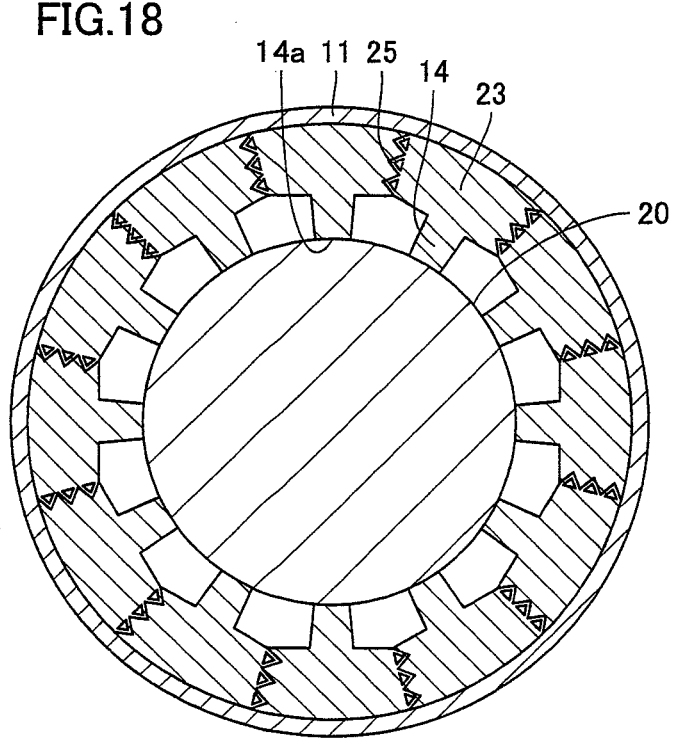
FIG. 18 is a cross section for illustrating a second step of fabricating the stator core in the second embodiment.

With reference to FIG. 17 to FIG. 20, the second embodiment provides stator core 10 fabricated in a method, as will be described hereinafter. FIG. 17 is a cross section for illustrating a first step of fabricating stator core 10 in the second embodiment. FIG. 18 is a cross section for illustrating a second step of fabricating the stator core in the second embodiment. As shown in FIG. 17, divided stator cores 23 have their weak portions 25 and recesses 26 combined together to form an annulus.

Then, with reference to FIG. 18, columnar internal die 20 is inserted into annularly assembled stator core 22, and fixing member 11 is shrink fitted to an outer circumferential surface of assembled stator core 22.

Figure 19:
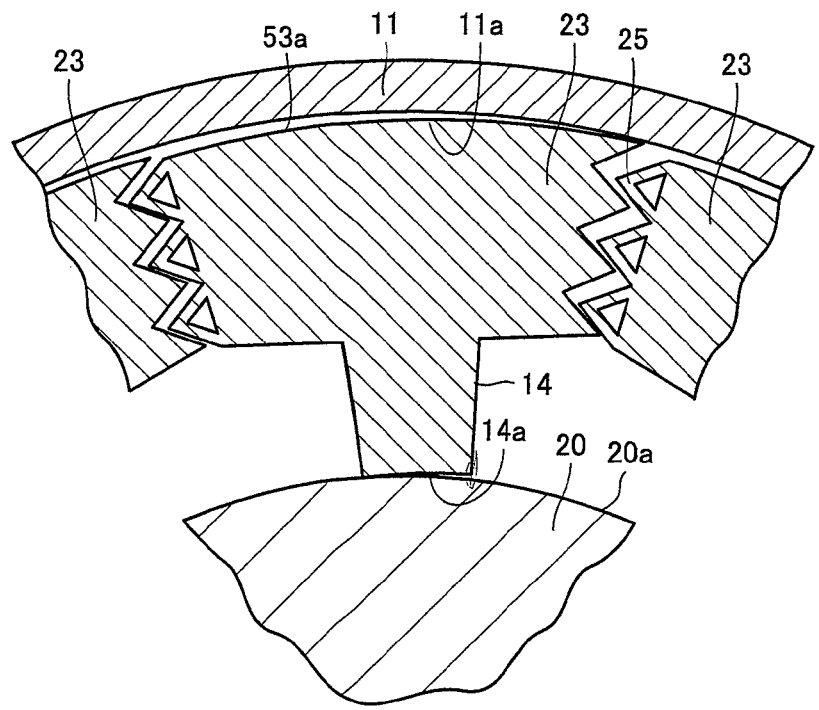
FIG. 19 is a partially enlarged cross section of FIG. 18.
Figure 20:
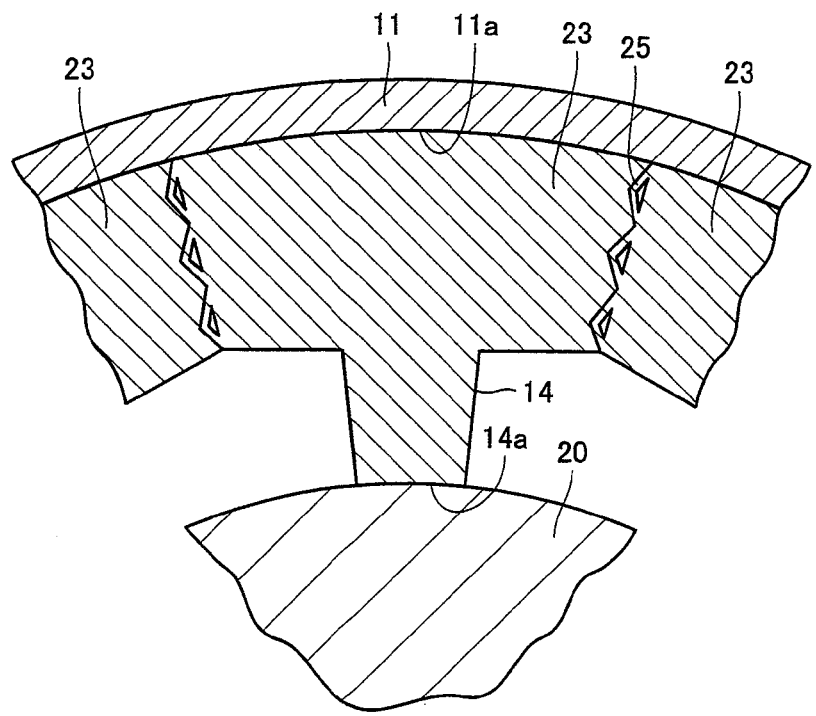
FIG. 20 is a cross section for illustrating the FIG. 19 positionally offset divided stator core in a second state following a first state shown in FIG. 19.

FIG. 19 is a partially enlarged cross section of FIG. 18. FIG. 20 is a cross section for illustrating the FIG. 19 positionally offset divided stator core 23 in a second state following a first state shown in FIG. 19. As shown in FIG. 19, when fixing member 11 is shrink fitted, a particular divided stator core 23 may be fixed such that it is rotated. Divided stator core 23 is fixed in such a condition for example: when internal die 20 is inserted or fixing member 11 is shrink fitted, divided stator core 23 and internal die 20 contact each other; or when fixing member 11 is attached, divided stator core 23 is positionally offset; or the like.

For example, as shown in FIG. 19, divided stator core 23 rotated from a predetermined position leftward has its outer circumferential surface 53a with a right portion located radially outer than another divided stator core 23.

Furthermore, the positionally offset divided stator core 23 as seen in its circumferential direction has a right end surface with a radially outward portion spaced from an end surface of an adjacent divided stator core 23 and is thus in contact only at a radially inward portion. Furthermore, stator tooth 14 has end surface 14a with a circumferentially right portion lifted off outer circumferential surface 20a of internal die 20.

If fixing member 11 is shrink fitted adjacent to an outer circumference of divided stator core 23 thus positionally offset, divided stator core 23 has outer circumferential surface 53a pressed intensively at a circumferentially right portion. Furthermore, the right end surface in the circumferential direction has only the radially inward portion pressed by the adjacent divided stator core 23.

Divided stator core 23 rotated leftward and thus offset from the predetermined position thus receives a force exerted from therearound to rotate it rightward.

Accordingly, as shown in FIG. 20, the positionally offset, divided stator core 23 can deform its weak portion 25 provided at an end surface thereof as seen in its circumferential direction and weak portion 25 of the adjacent divided stator core 23 for example in the circumferential direction to be accommodated at the predetermined position.

The divided stator core 23 thus accommodated can have its surfaces located at its ends opposite in the circumferential direction satisfactorily in contact with those of adjacent divided stator cores 23 and stator core 10 resultantly formed can have circumferential magnetic resistance distributed generally uniformly.

In particular, it can reduce/prevent a portion partially high in magnetic resistance, and hence reduce core loss. An efficient rotating electric machine can thus be provided.

Furthermore, stator tooth 14 can also have end surface 14a along internal die 20 at outer circumferential surface 20a, and vibration and other similar detriments of rotor 112 can be reduced/prevented.

Note that a divided stator core having both weak portion 15 of the first embodiment and weak portion 25 of the second embodiment allows circumferential magnetic resistance to be distributed uniformly and also stator teeth to have their end surfaces aligned on the circumference of a single circle if the divided stator core is rotated from a predetermined position or radially projects in a fabrication process.

It should be understood that the embodiments disclosed herein are illustrative and non-restrictive in any respect. The scope of the present invention is defined by the terms of the claims and intended to include any modifications within the scope and meaning equivalent to the terms of the claims.

INDUSTRIAL APPLICABILITY

The present invention is suitable for stator cores of rotating electric machines and in particular for rotating electric machines mounted in hybrid vehicles, electric vehicles and the like.

The invention claimed is:

1. A stator core comprising:
an assembled stator core formed of a plurality of divided stator cores annularly arranged;
a fixing member disposed at an outer circumferential surface of said assembled stator core and capable of pressing each of said divided stator cores inward in a radial direction of said assembled stator core to annularly arrange and thus fix said divided stator cores; and
a weak portion provided between said divided stator cores and said fixing member, the weak portion being deformed by at least one of plastic deformation and brittle fracture by a force exerted from said fixing member to press said divided stator cores when said fixing member is assembled to said assembled stator core,
wherein said weak portion includes a space portion provided internal thereto.

2. The stator core according to claim 1, wherein said weak portion is deformed in said radial direction of said assembled stator core.

3. The stator core according to claim 1, wherein said weak portion is integrated with and monolithically formed with at least one of an outer circumferential surface of said divided stator core and an inner circumferential surface of said fixing member.

4. A stator core comprising:
an assembled stator core formed of a plurality of divided stator cores annularly arranged;
a fixing member disposed at an outer circumferential surface of said assembled stator core and capable of pressing each of said divided stator cores inward in a radial direction of said assembled stator core to annularly arrange and thus fix said divided stator cores; and
a weak portion provided to said divided stator core at an end in a circumferential direction of said divided stator core, more than one said weak portion being arranged radially, said weak portion being provided between said divided stator cores and being deformed by a force exerted from said fixing member to press said divided stator core when said fixing member is assembled to said assembled stator core,
wherein said weak portion is monolithically formed with said divided stator core.

5. The stator core according to claim 4, wherein said weak portion is deformed in a circumferential direction of said assembled stator core.

6. The stator core according to claim 4, wherein said weak portion includes a space portion provided internal thereto.

7. A stator core comprising:
an assembled stator core formed of a plurality of divided stator cores annularly arranged; and
a fixing member disposed at an outer circumferential surface of said assembled stator core and capable of pressing each of said divided stator cores inward in a radial direction of said assembled stator core to annularly arrange and thus fix said divided stator cores, one of said fixing member and said divided stator core being lower in hardness than the other of said fixing member and said divided stator core to be deformed by a force exerted from said fixing member to press said divided stator core when said fixing member is assembled to said assembled stator core, the stator core including at least one of a first projection formed to be integral with an outer circumferential surface of said divided stator core and a second projection formed to be integral with an inner circumferential surface of said fixing member, the stator core causing at least one of: causing said first projection of said divided stator core located radially outer than another said divided stator core adjacent thereto to enter said fixing member; and causing said second projection of said fixing member that presses said divided stator core located radially outer than said other divided stator core adjacent thereto to enter said divided stator core located radially outer than said other divided stator core adjacent thereto.

8. A rotating electric machine comprising:
an assembled stator core formed of a plurality of divided stator cores annularly arranged;
a fixing member disposed at an outer circumferential surface of said assembled stator core and capable of pressing each of said divided stator cores inward in a radial direction of said assembled stator core to annularly arrange and thus fix said divided stator cores;
a weak portion provided between said divided stator cores and said fixing member, the weak portion being deformed by at least one of plastic deformation and brittle fracture by a force exerted from said fixing member to press said divided stator cores when said fixing member is assembled to said assembled stator core;
a rotatable rotation shaft inner than said assembled stator core; and
a rotor fixed to said rotation shaft,
wherein said weak portion includes a space portion provided internal thereto.

9. A rotating electric machine comprising:
an assembled stator core formed of a plurality of divided stator cores annularly arranged;
a fixing member disposed at an outer circumferential surface of said assembled stator core and capable of pressing each of said divided stator cores inward in a radial direction of said assembled stator core to annularly arrange and thus fix said divided stator cores;
a weak portion provided to said divided stator core at an end in a circumferential direction of said divided stator core, more than one said weak portion being arranged radially, said weak portion being provided between said divided stator cores and deformed by a force exerted from said fixing member to press said divided stator core when said fixing member is assembled to said assembled stator core;
a rotatable rotation shaft inner than said assembled stator core; and
a rotor fixed to said rotation shaft,
wherein said weak portion is monolithically formed with said divided stator core.

10. A rotating electric machine comprising:
a rotatable rotation shaft;
a rotor fixed to said rotation shaft;
an assembled stator core formed of a plurality of divided stator cores annularly arranged; and
a fixing member disposed at an outer circumferential surface of said assembled stator core and capable of pressing each of said divided stator cores inward in a radial direction of said assembled stator core to annularly arrange and thus fix said divided stator cores, one of said fixing member and said divided stator core being lower in hardness than the other of said fixing member and said divided stator core to be deformed by a force exerted from said fixing member to press said divided stator core when said fixing member is assembled to said assembled stator core, the stator core including at least one of a first projection formed to be integral with an outer circumferential surface of said divided stator core and a second projection formed to be integral with an inner circumferential surface of said fixing member, the rotating electric machine causing at least one of: causing said first projection of said divided stator core located radially outer than another said divided stator core adjacent thereto to enter said fixing member; and causing said second projection of said fixing member that presses said divided stator core located radially outer than said other divided stator core adjacent thereto to enter said divided stator core located radially outer than said other divided stator core adjacent thereto.

* * * * *